March 22, 1955   C. D. GALLOWAY   2,704,593
APPARATUS FOR ASSEMBLING STORAGE BATTERY ELEMENTS
Filed April 12, 1949   7 Sheets-Sheet 1

INVENTOR.
Charles Douglas Galloway
BY
Edward J. Dwyer
ATTORNEY

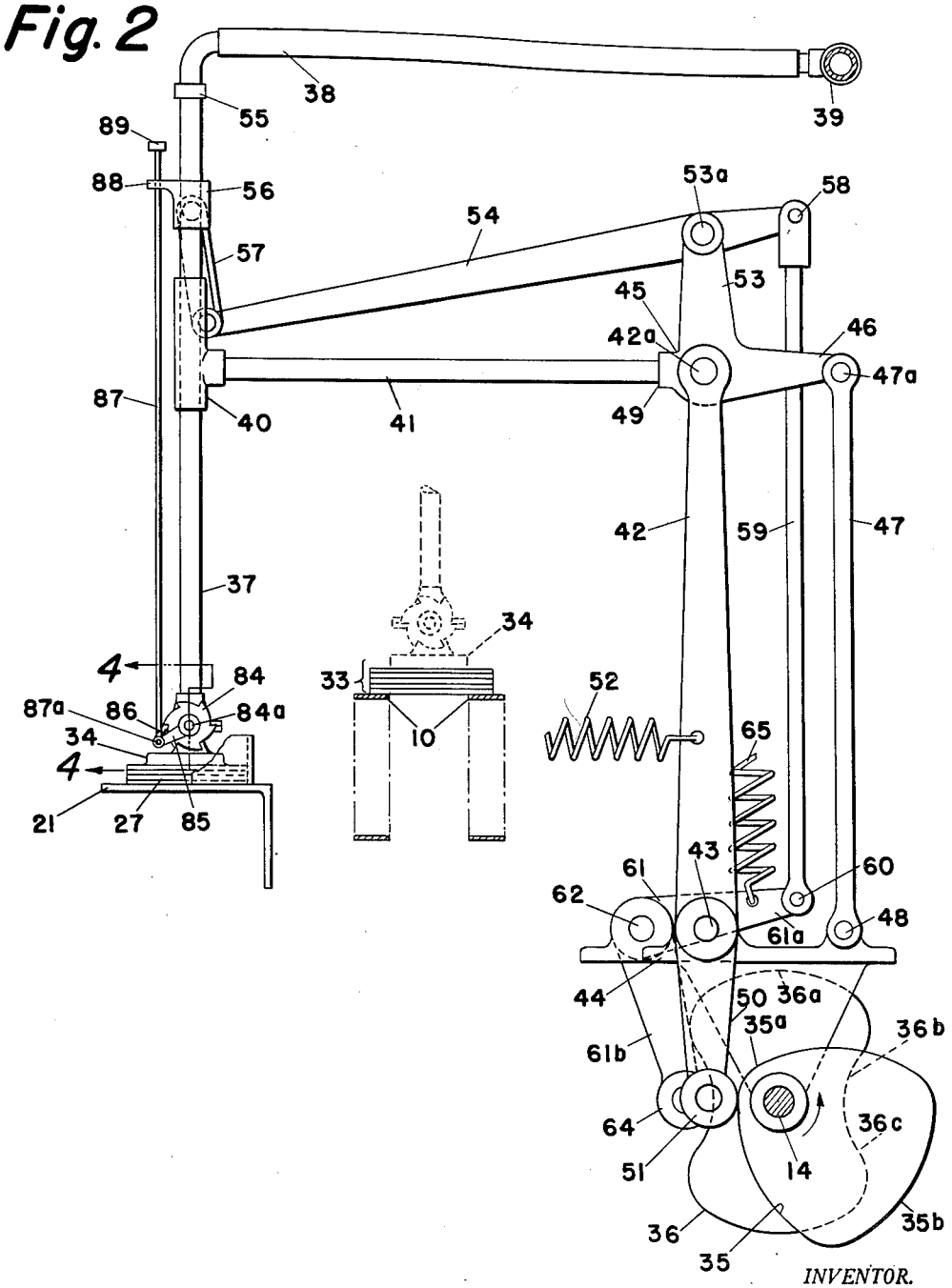

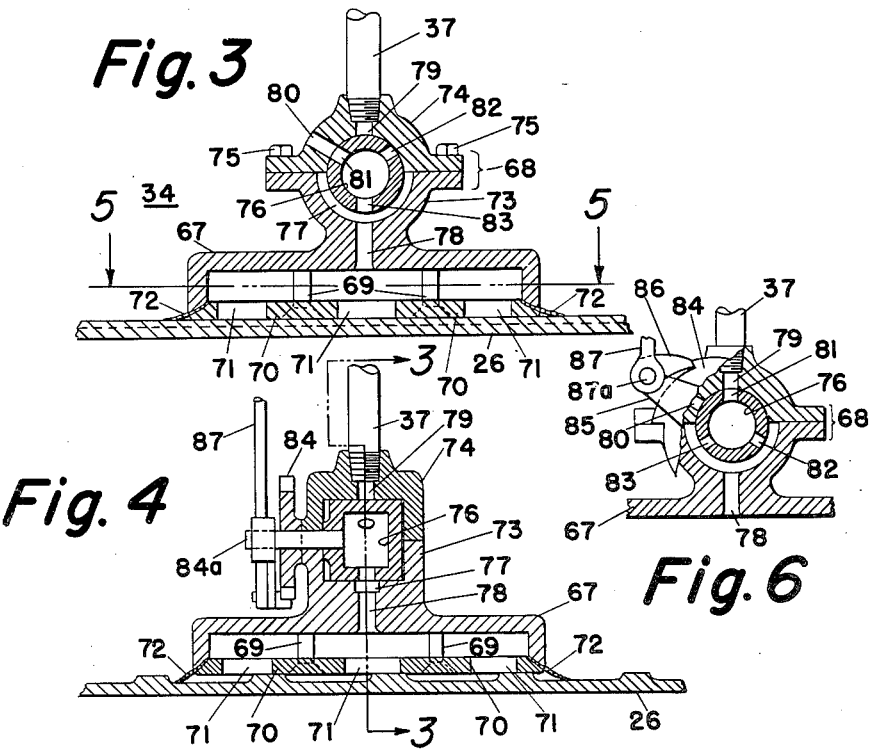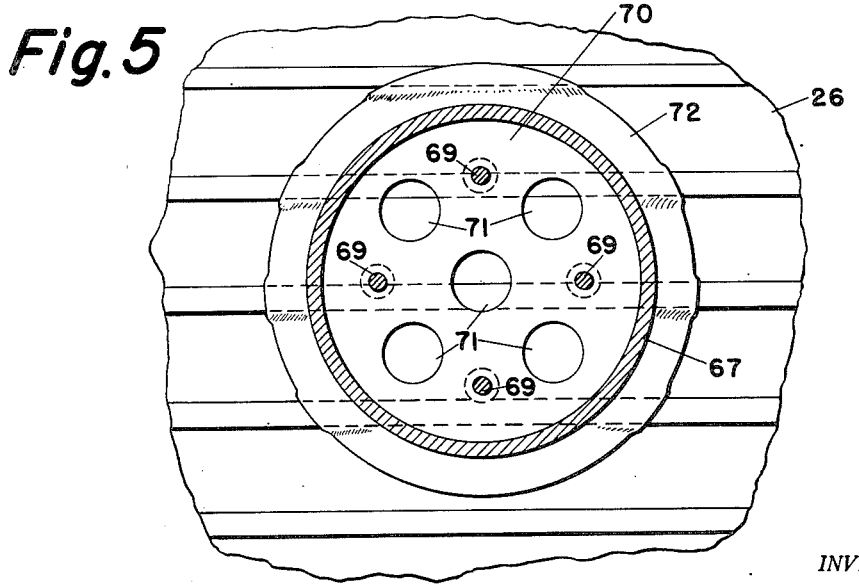

March 22, 1955 C. D. GALLOWAY 2,704,593
APPARATUS FOR ASSEMBLING STORAGE BATTERY ELEMENTS
Filed April 12, 1949 7 Sheets-Sheet 4

INVENTOR.
Charles Douglas Galloway
BY
ATTORNEY

March 22, 1955 — C. D. GALLOWAY — 2,704,593
APPARATUS FOR ASSEMBLING STORAGE BATTERY ELEMENTS
Filed April 12, 1949 — 7 Sheets-Sheet 6

INVENTOR.
Charles Douglas Galloway
BY
ATTORNEY

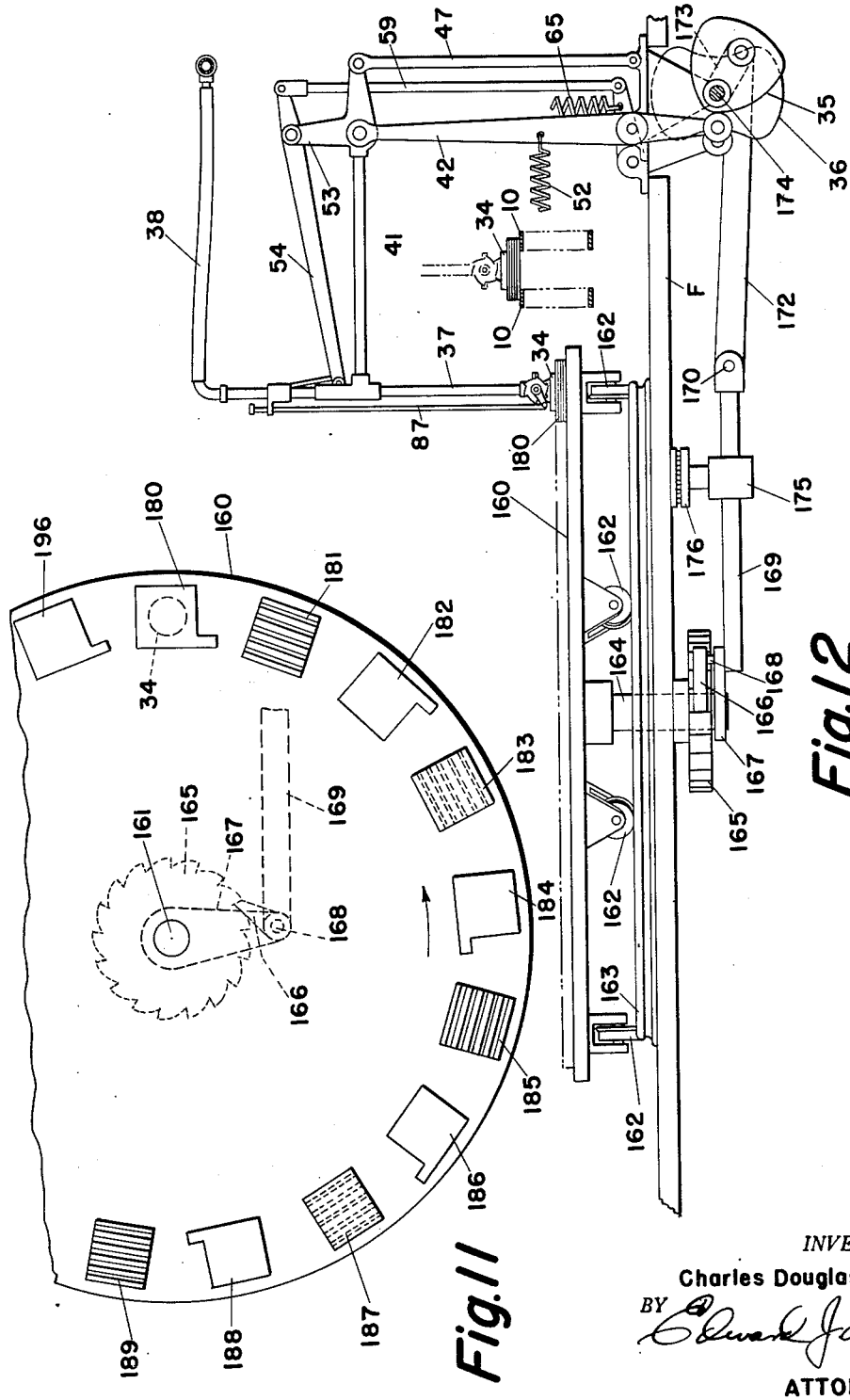

United States Patent Office 2,704,593
Patented Mar. 22, 1955

2,704,593

APPARATUS FOR ASSEMBLING STORAGE BATTERY ELEMENTS

Charles Douglas Galloway, Wyndmoor, Pa., assignor to The Electric Storage Battery Company, a corporation of New Jersey Application April 12, 1949, Serial No. 86,882

12 Claims. (Cl. 198—35)

This invention relates to apparatus for assembling elements, more particularly elements comprising plates and separators for storage batteries, the present application being a continuation in part of my earlier filed application, Serial No. 545,509, filed July 18, 1944, now abandoned.

One of the objects of the invention is to provide apparatus for assembling from separate stack piles of positive and negative plates and separators, completely assembled elements each comprising the desired number of alternately disposed positive and negative plates with interposed separators.

Another object is to provide such an element builder in which a traveling conveyor moves past a series of stationary shelves supporting, alternately, stacks of negative plates, separators and positive plates and in which at each such supply station a device is operated to remove from the stack and deposit on the conveyor a plate or separator as the case may be be.

Another object is to provide in such an element builder a device for transferring plates and separators in which automatic compensation for variation in the heights of stack piles and element assemblies is included.

Another object is to provide in such an element builder means for synchronizing the various parts so that the plate or separator removed from the stack at each station will be accurately deposited on the partially completed element being carried by the conveyor past that station.

One embodiment of the invention hereinafter described comprises a traveling conveyor which may be in the form of two parallel belts adapted for supporting and transporting the elements in the process of assembly, along which conveyor is disposed at suitable intervals a series of shelves for supporting stacks of plates and separators, in proper order, beginning with a stack of negative plates, then a stack of separators, then a stack of positive plates, then a stack of separators, this series being repeated to provide for the desired number of plates in the completed element. At each station along the conveyor is provided vacuum apparatus for lifting from the stack at that point an assembly item (plate or separator, as the case may be) and depositing it on the partly assembled element on the conveyor. The subsequent travel of the conveyor carries this element to the next station where another assembly item is added. As each element reaches the stage where the desired number of plates has been assembled it is removed from the conveyor, the entire process being continuous.

Further in accordance with my invention, there are disposed on opposite sides of the conveyor stacks of plates and separators, each opposed stack having associated therewith a pair of suction heads for alternately lifting therefrom a plate and a separator. In this form of the invention the length of the conveyor may be greatly decreased. The apparatus is somewhat simpler and as a whole is much more compact.

In still another form of the invention, the plates and separators are disposed on rotary platforms on opposite sides of the conveyor. Accordingly, by using two co-operatively associated suction heads an entire battery element including the plates and separators may be assembled at a single location.

This invention will be more clearly understood by reference to the following description of the several embodiments thereof in connection with the accompanying drawings in which:

Fig. 2 is a enlarged section taken on the line 2—2 of Fig. 1;

Fig. 3 is a sectional elevation of the vacuum lifting head and operating valve therefor, taken on the line 3—3 of Fig. 4;

Fig. 4 is a sectional elevation of the vacuum lifting head and valve, taken on a plane at right angles to that of Fig. 3 and on the line 4—4 of Fig. 2;

Fig. 5 is a horizontal section of the vacuum lifting head taken on the line 5—5 of Fig. 3;

Fig. 6 is a fragmentary view showing the valve of Fig. 3 and 4 with the valve member rotated through an angle of 60°, the position where the suction is operative;

Figure 7:
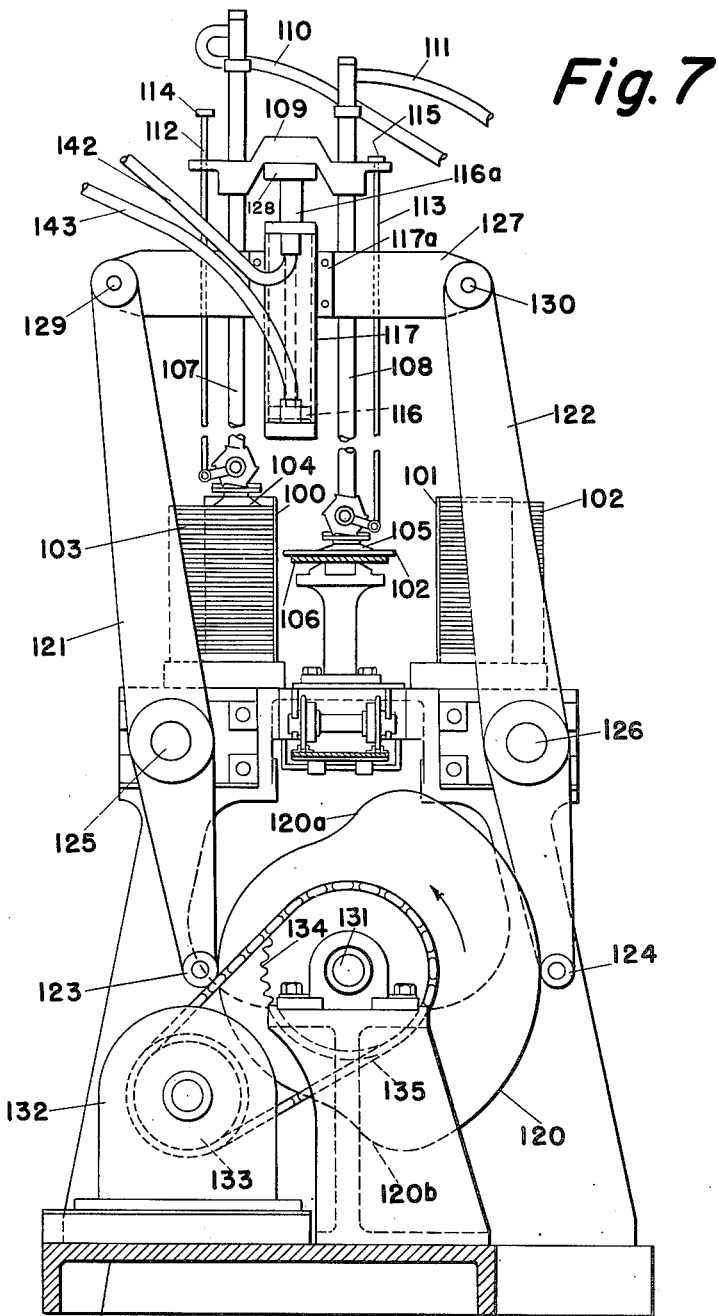
Fig. 7 is an end elevation of a modification in which there are stacks of plates and separators on opposite sides of a central conveyor, together with associated pair of suction heads.
Figure 8:
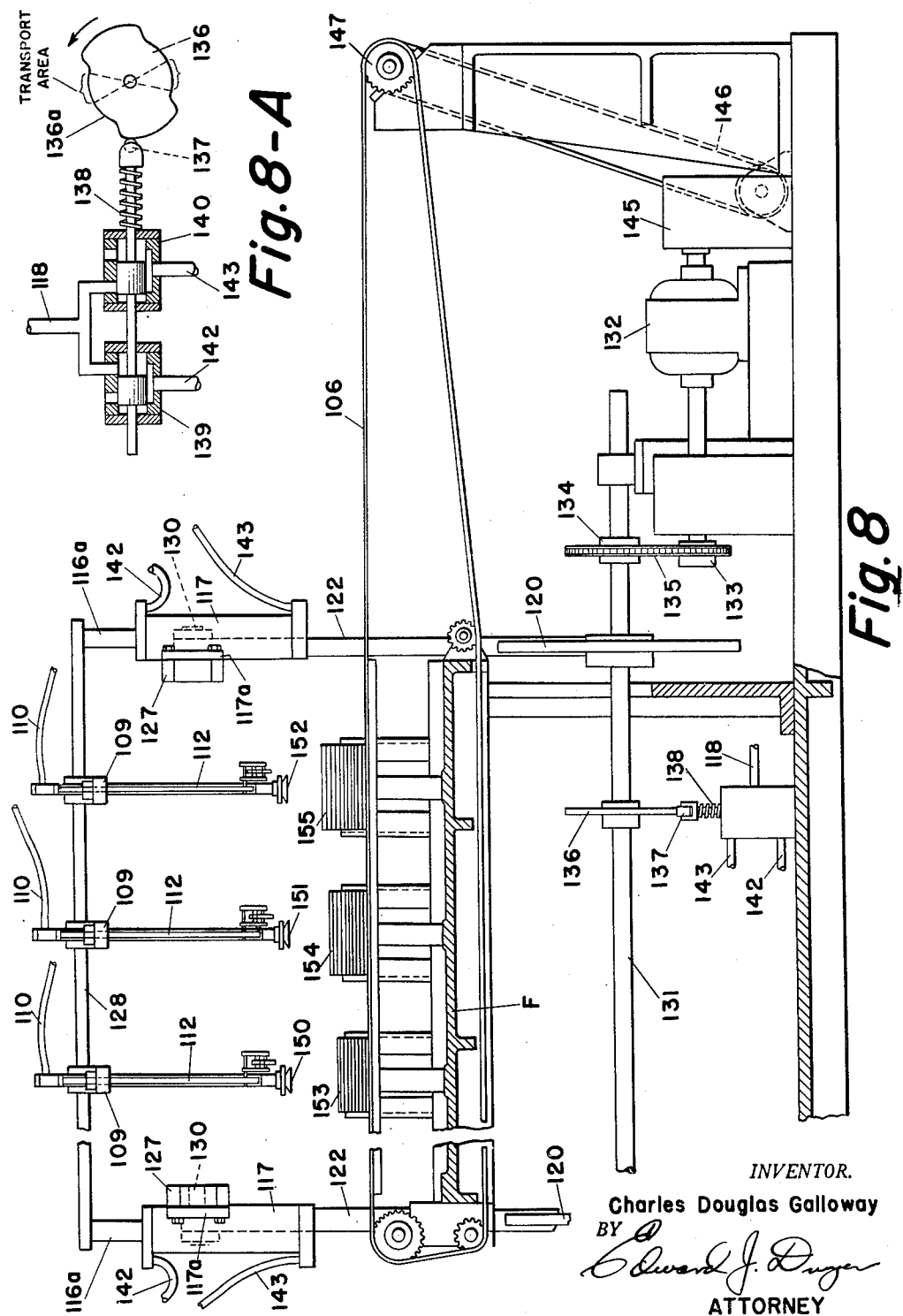
Fig. 8 is a side elevation of the apparatus of Fig. 7.
Figure 9:
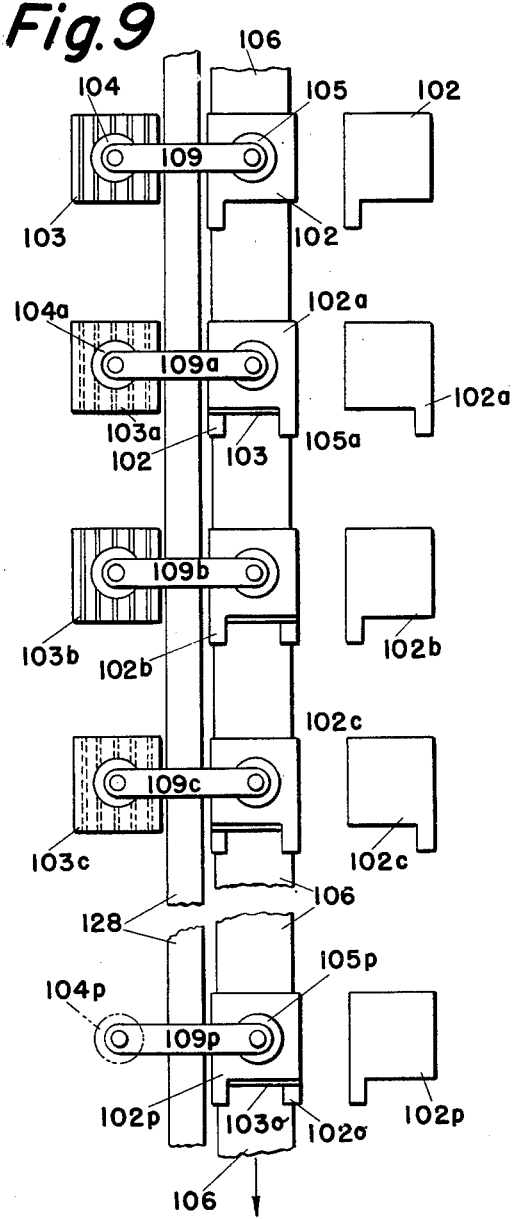
Figure 10:
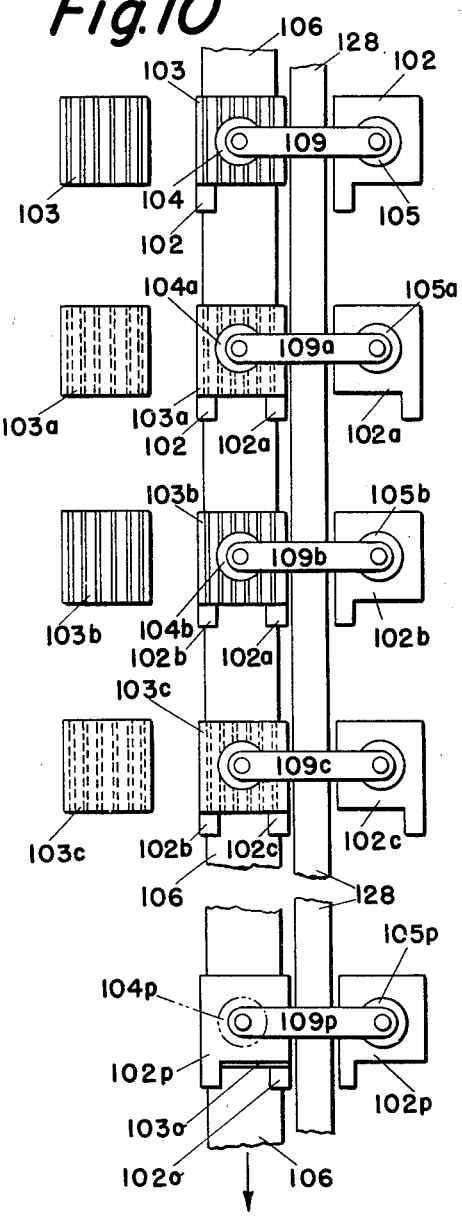

Fig. 8-A is a fractional sectional view of the control valve and cam of the elevating mechanism for the suction heads;

Figs. 9 and 10 diagrammatically illustrate a fraction of the apparatus of Figs. 7 and 8 with the suction heads in different positions to illustrate the manner in which the storage battery elements are assembled;

Fig. 11 is a fractional plan view of the table and its driving mechanism; and

Fig. 12 is an end elevation of a further modification of the invention in which the plates and separators are supported on a turntable.

Figure 1:
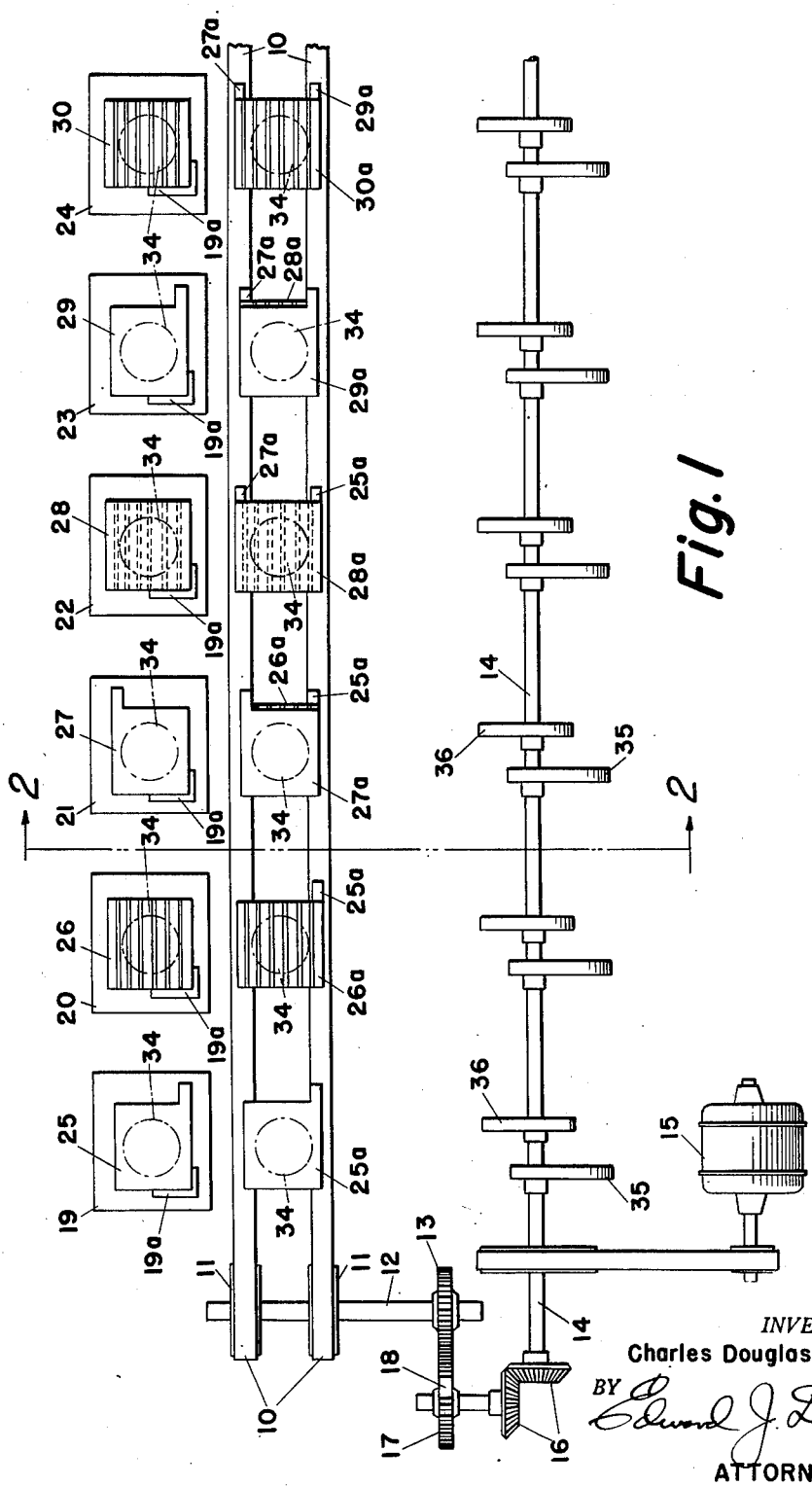
Fig. 1 is a plan view of a portion of the assembly apparatus showing the conveyor belt carrying the partially completed elements and the series of stack piles of plates and separators alongside the conveyor, details of the lifting and transporting mechanisms being omitted in this figure.

Referring to Fig. 1, there is provided a conveyor formed by a pair of parallel conveyor belts 10, carried on sprocket chains not shown, driven by the sprocket wheels 11, 11, mounted on the shaft 12, on which shaft is also mounted the gear wheel 13. In parallel with the conveyor belts is the cam shaft 14, driven in any suitable manner as by the belt-drive from a motor 15. The cam shaft 14 is connected to the shaft 12 through the bevel gears 16 and the pinion 17 which meshes with the gear 13. The teeth of pinion 17 are omitted over a short space at 18 to provide for intermittent travel of the conveyor belts, causing them to stop momentarily when the partially assembled elements are opposite the corresponding steack piles 25-30 while a plate or separator is being deposited.

There are provided supporting shelves 19-24 for the stack piles of plates and separators. On support 19 is a stack of negative plates 25. On support 20 is a stack of separators 26 with upwardly facing grooves. On support 21 is a stack of positive plates 27, and on support 22 a stack of separators with downwardly facing grooves. This order is repeated throughout the entire length of the conveyor, only a portion of which is here shown. The number of stack piles will vary with the number of plates to be assembled in the element, e. g., 15 plates—29 stack piles; 17 plates—33 stack piles. Fixed on each supporting shelf is an upstanding angle guide 19a to provide for accurately locating the stack. The position of these guides may, of course, be adjustable by any well known means, not shown, to provide for centering beneath the respective suction heads, indicated by broken line circles, plates and separators of different dimensions.

On the conveyor belts 10 are shown the partially completed elements. At the first station there is a single negative plate 25a, at the next a negative plate 25a and a separator 26a; next a group consisting of a negative plate 25a, separator 26a and positive plate 27a, etc. At each station an item from the adjacent stack pile has just been added. The broken line circles 34 show the outlines of the vacuum-lifting heads, the details of which are shown in Figs. 3, 4 and 5.

On the cam shaft 14 are mounted at each station the cams 35 and 36 for operating, respectively, the mechanisms for horizontal and vertical motion, the details of which are shown in Fig. 2.

In Fig. 2 is shown the mechanism for lifting a plate or separator from the stack pile and depositing it on the partially assembled element on the conveyor. This mechanism is repeated at each station along the conveyor. The shelf 21 supports the stack pile 27. The partially assembled element is shown at 33 carried on the conveyor belts 10. In the position of this mechanism shown, the vacuum-lifting head 34 is resting on the stack pile 27. The details of this head will be described later in connection with Figs. 3, 4 and 5. Upon the establishment of the vacuum within this head by means hereinafter described, the topmost plate or separator on the stack pile will be held against the under surface of the head and will be lifted off of the stack when the head is raised.

The head 34 is attached to the lower end of the hollow supporting pipe 37, which pipe is connected at its upper end to the flexible tube 38 connected at its other end to the vacuum-supply pipe 39 within which a vacuum is maintained by any suitable means not shown. The pipe 37 is arranged to slide vertically in the sleeve 40, carried on the horizontal bar 41 of the mechanism for horizontal transfer. This mechanism includes the vertical actuating rocker arm 42, pivoted at 43 in a suitable stationary bearing 44. At the upper end of the arm 42 is pivotally supported at 42a the head piece or bell-crank 45. This head piece is provided with an integral lateral projection or arm 46 to which is pivotally attached, as at 47a, the upper end of a parallel guide bar 47 whose lower end is pivotally supported at the stationary bearing 48. At the point 49 of the head piece is attached one end of the horizontal bar 41. From the above description it will be seen that, as the rocker-arm 42 and the parallel guide bar 47 rock back and forth, the bar 41 will always be maintained in a horizontal position and the sleeve 40 at right angles to the bar 41 will remain vertical.

A lower end or projection 50 of the rocker arm 42 extends below the pivot 43 and carries a roller 51 riding on the peripheral surface of the cam 35, mounted on the cam shaft 14. The roller 51 is held against the cam surface by any suitable means, as by a spring 52.

The crank or head-piece 45 is provided with an upstanding arm or projection 53 to which is pivoted at 53a the lever-arm 54 which is arranged to transmit vertical travel to the pipe 37 and the vacuum head 34. Attached to the pipe 37 near its upper end is a collar 55, below which is slidably mounted on the pipe 37 the swivel head 56, pivotally connected by the link 57 to the end of the lever arm 54. The opposite end of the lever arm 54 is pivoted at 58 to the vertical actuating rod 59 whose vertical travel is effected by the mechanism shown in Fig. 2 which will now be described.

The lower end of rod 59 is pivoted at 60 to one arm 61a of the bell-crank 61. This bell-crank is pivotally supported at 62 by a stationary bearing. The other arm 61b of the bell-crank carries at its lower end the roller 64 which is held by any suitable means, as the spring 65, against the peripheral surface of the cam 36 mounted on the cam shaft 14.

In Figs. 3, 4, 5 and 6 are shown the details of the vacuum-lifting head 34, which is shown resting on the grooved surface of a separator 26. This head comprises the inverted cup-shaped member 67 surmounted by the valve housing 68, attached to the lower end of the vacuum pipe 37. Across the mouth of the cup 67 is fastened as by screws 69 the support plate 70 provided with openings 71. The object of this support plate is to prevent the separator or battery plate which is being lifted by reason of the vacuum in the cup from being forced into the cup and bent or distorted by the air pressure outside. Around the lower periphery of the cup 67 is a skirt 72 of thin flexible rubber or similar material adapted to follow, as shown in Fig. 5, any irregularities in the surface of the object to be lifted, as for example the grooves of the separator 26, and thus substantially close any air leaks at such points which would impair the vacuum in the cup.

As stated above, the vacuum cup 67 is surrounded by the valve housing 68 which may be in two parts, viz., a base part 73 cast integral with or otherwise attached to the vacuum cup 67, and the cap part 74 to which is attached the lower end of the vacuum pipe 37, the two parts being fastened together by any suitable means, as the bolts 75. Within the valve housing 68 is shown a cylindrical valve chamber into which is fitted the cylindrical valve 76 arranged for rotation about a horizontal axis. The valve chamber is provided in its lower surface with a semi-circular groove 77 communicating with the interior of the vacuum cup by the passage 78. The valve chamber communicates above with the vacuum pipe 37 through the passage 79 and with the external air via the passage 80, Figs. 3 and 6.

The valve 76 is hollow and is provided with three ports 81, 82 and 83 spaced circumferentially 120° apart and located to register with the passages 79 and 80 and with the groove 77 as the valve is rotated. The passages 79 and 80 are spaced circumferentially 60° apart, so that, when any one of the ports 81, 82 or 83 registers with, say, the passage 79, the passage 80 will be cut off, and vice versa. The interior of the vacuum cup 67 is always in communication with the interior of the valve 76 via passage 78, groove 77 and at least one of the ports 81, 82 or 83.

From the above description, it will be seen that, if the valve 76 is rotated through successive angles of 60°, the interior of the valve and therefore of the vacuum cup will be put in communication alternately with the vacuum pipe 37 (with the external air cut off) and with the external air (with the vacuum cut off).

Rotation of the valve through successive 60° steps, with periods of rest between, in synchronism with the operation of the lifting and transporting mechanism, is effected by the mechanism illustrated in Fig. 2. Attached to the valve 76 is an axial shaft 84a passing through the valve housing, on the outer end of which is mounted the ratchet wheel 84 provided with six teeth spaced 60° apart. Suitably mounted for angular motion about the axis of the valve and the ratchet wheel 84 is shown the ratchet lever 85 to which is pivoted at 87a the pawl 86 arranged to engage the teeth of the ratchet wheel in the usual manner. Reciprocal movement of the lever 85 through an angle of 60° is effected by the vertical rod 87 pivoted at 87a to the outer end of the lever 85 from which point it passes upwardly, Fig. 2, and is slidably supported in an opning in the projection 88 from the swivel head 56. Above the projection 88 the rod 87 terminates in a button head 89. When the mechanism is in its lowermost position, as illustrated in Figure 2, the outer end of ratchet lever 85 may rest on the upper surface of vacuum cup 67. In this position the vertical distance between the under surface of button head 89 and the under surface of collar 55 equals the vertical distance that the outer end of said ratchet lever travels in rotating 60° from its lowermost position. Thus, when the outer end of lever 54 starts upward to lift the swivel head 56, the latter will slide along the pipe 37 and the rod 87 until the upper surface of the swivel head comes in contact with the button head 89. Further upward travel of the swivel head will lift the rod 87 without lifting the pipe 37, thus causing the ratchet lever 85 to rotate, and the pawl 86, engaging one of the teeth of the ratchet wheel 84, will rotate the valve 76 (Fig. 3) through an angle of 60° to the position shown in Fig. 6. At this point in the travel, the upper surface of swivel head 56 will come in contact with collar 55 and thereafter the rod 87 and the pipe 37 with the attached valve housing and vacuum cup will be lifted together and no further rotation of the valve 76 in its housing will take place. It will thus be noted that by reason of the upward sliding motion of the swivel head 56 along the pipe 37, until it contacts with the collar 55, a so-called "lost motion" connection is provided between the lever arm 54 and the pipe 37. When the travel of the lever 54 is reversed in direction, the pipe 37 and the rod 87 will be lowered together until the vacuum head comes to rest on a stack pile or an element assembly, whereupon further downward travel of the lever 54 will cause the swivel head 56 to slide down along the pipe 37 carrying with it the rod 87 until the ratchet lever 85 comes to rest, as against the upper surface of the vacuum head 34. The swivel head 56 will then slide down along the pipe 37 and the rod 87 until the lever 54 reaches the lower limit of its travel, bringing the mechanism again into positions similar to those shown in Fig. 2.

It is thus seen that the lost motion connection renders operation of the mechanism independent of the vertical position of the head 34 when its downward movement is stopped by engagement either with a stack or with a partially assembled element. This arrangement makes possible operation of the mechanism irrespective of the heights of the stacks or elements, the heights of which necessarily vary as items are removed from the stacks and placed on the elements and as the stacks are replenished.

The operation of the apparatus above described is as follows, referring particularly to the mechanism located at station 21. As a certain point in the travel of the partly assembled element 33 toward a position opposite the stack pile 27 the mechanism will be in the position shown in Fig. 2. The rocker arm 42 will be in its extreme lefthand position, the pipe 37 and vacuum cup 34 being directly above the stack pile 27. The lever 54 will be in its lowest position, the swivel head 56 being somewhat below and out of contact with the collar 55 and the button head 89, so that the vacuum head 34 will rest on the stack pile 27.

The position of the valve 76, Fig. 3, will be such as to cause one of the ports 81, 82 or 83 to register with the air passage 80 and there will be no vacuum in the cup 67.

The revolution of the cam 36, in the counter-clockwise direction as viewed in Fig. 2, will now, through the belt-crank 61, the rod 59 and the lever 54, raise the swivel head 56, bringing it first into contact with the button head 89 to lift the rod 87 and, by means of the ratchet lever 85, pawl 86 and ratchet wheel 84, cause the valve 76 (Fig. 3) to rotate through an angle of 60°, bringing the port 81 which had registered with the air passage 80 around to register with the vacuum passage 79 (see Fig. 6), thus cutting off the air and applying suction to the cup 67. The resulting vacuum in cup 34 will cause the uppermost plate on the stack pile 27 to be held against the under surface of the vacuum cup 34. Further upward travel of the lever 54 will lift the pipe 37 and vacuum cup 34 with the attached plate to the uppermost position.

During this period of operation the rocker arm 42 will remain stationary, since the roller 51 will be bearing against the circular portion 35a of the periphery of cam 35. When the lever 54 has reached its uppermost position, it will remain stationary since the roller 64 will be bearing on the circular portion 36a of the cam 36. At this point the cam 35 will have rotated to bring the portion of increasing radius against the roller 51, thus moving the upper end of rocker arm 42 to its extreme righthand position, bringing the vacuum cup 34 with attached plate over the partly assembled element 33. The rocker arm 42 will then become stationary, the roller 51 then bearing against the circular surface 35b of the cam 35, while the lever 54 will be lowered by engagement of roller 64 with portion 36b of cam 36 having a decreasing radius until the plate carried by the vacuum head rests on the element 33.

Just before the plate is deposited, the driving pinion 17 (Fig. 1) will reach a position where the blank space 18 comes opposite the gear 13, and the travel of the conveyor will stop momentarily while the plate is being deposited on the partly assembled element.

Further downward travel of lever 54 will cause the swivel head 56 to slide down on pipe 37, lowering the rod 87 until the ratchet lever 85 rests on vacuum cup 34. The lever 54 will then continue its downward travel to the lower limit, causing swivel head 56 to slide down along pipe 37 and rod 87. Roller 64 of bell-crank 61 will now be bearing against the peripheral surface 36b of cam 36, but further rotation of cam 36 will immediately bring roller 64 on the peripheral surface 36c of increasing radius, causing lever 54 to start on its upward travel. This will raise swivel head 56, first contacting with button head 89 to cause valve 76, by means of the pawl and ratchet, to rotate through an angle of 60°, cutting off the vacuum and introducing air into the vacuum cup to release the plate. Further upward motion of lever 54 will lift the vacuum cup into its uppermost position and the rocker-arm 42, by reason of the rotation of cam 35, will carry the mechanism to the extreme lefthand position ready to lift another plate from the stack pile and deposit it, as above described, on the next partially assembled element which will have been brought opposite the stack pile by the travel of the conveyor. In further explanation of the operation of the apparatus above described, the following points may be noted:

The height of the stack piles of plates and separators will vary as items are removed and the piles replenished. The vertical travel of the lever arm 54 will always be the same; but, when the stack pile is high, the vacuum head 34 will come to rest on the top of the pile before the lever arm 54 has reached the lower limit of its travel, and thereafter the swivel head 56 will slide down along the pipe 37. The same will be true in respect to any variation in height of the partly assembled elements on the conveyor.

The overall length of the conveyor and the corresponding number of stack pile stations will be such as to provide for the assembly of elements of the maximum number of plates that may at any time be required. When elements of lesser number of plates are to be assembled, the stations beyond those required for the reduced number of plates will be empty of plates and separators, so that no further additions will be made to the elements as they pass.

After each assembled element has passed the point where the assembly is complete, it will be removed from the conveyor by any suitable means, not shown.

While there is disclosed in the above description a conveyor traveling horizontally, in a straight line, it will be understood that a conveyor moving in a circular path could be substituted.

In the modification of Figs. 7-8 the length of the conveyor has been substantially reduced by locating on opposite sides thereof a series of magazines for the support of the required number of plates and separators. In Fig. 7, two such magazines formed by the angular members 100 and 101 have been shown, it being understood that there will be a series of them lengthwise of the conveyor. All of the magazines or stack piles on one side of the apparatus may alternately comprise positive and negative plates, while on the opposite side there may be stack piles of separators. For example, the magazine 101 may be filled with a stack pile of negative plates 102, while the oppositely disposed magazine 100 may comprise a stack pile of separators 103.

With the parts in the position shown, the suction heads 104 and 105 are in their lowermost positions, the suction head 104 resting upon the stack pile of separators, while the suction head 105 is shown with a negative plate 102 lowered to the conveyor 106. The two suction heads are carried by tubular supports or pipes 107 and 108 respectively extending through a crosshead 109, and each has attached thereto a flexible suction line 110 and 111 for application of suction under the control of the actuating rods 112 and 113 of the lift valves, each of the same type as fully disclosed in connection with Figs. 1–6. The valve-actuating rods 112 and 113 are provided with buttons 114 and 115 engageable by the extensions of the crosshead 109 upon a predetermined upward movement thereof. The crosshead may be moved upwardly by any suitable means, such for example, as a cam-operating means of the type shown in Figs. 1–6, or by a pneumatic arrangement including a piston 116 operable within the cylinder 117 under the control of compressed air applied thereto through supply lines 142 and 143.

With the parts in the positions shown, and assuming the transporting cam 120 is rotating in a counterclockwise direction, it will be observed that two rocker arms 121 and 122 remain stationary, since the cam-engaging rollers 123 and 124 thereof are engaging those portions of cam 120 which are of circular shape. The two rocker arms are pivoted at 125 and 126, the upper ends thereof being connected together by a cross member 127 pivoted thereto by pivot pins 129 and 130. The cylinder 117 is secured to the cross member 127 and moves with it. As shown in Fig. 8, the assembly is duplicated at the opposite ends of the assembling machine, the two piston rods 116a being secured to a longitudinal head-actuating bar 128. This bar, also moved by rocker arms 121 and 122, not only serves to transport the suction heads 104 and 105 to and from positions above the respective stack piles 102 and 103, but also to control the vertical movement thereof.

The cam 120 secured to shaft 131 is driven by a motor 132 through sprocket gears 133 and 134, Fig. 8, and a sprocket chain 135. On the shaft 131 is secured a valve-operating cam 136 which, in Fig. 8-A, is shown in an angular position corresponding with that of cam 120 of Fig. 7.

Accordingly, it will be seen that after a short counter-clockwise movement of cams 120 and 136, the cam follower 137 under the action of a spring 138 is moved against the recessed surface 136a of the cam 136, thus closing valve 139 and opening valve 140.

With the parts as shown in Fig. 8–A, compressed air or other fluid under pressure is admitted by way of supply line 118 through the valve 139, and thence by fluid-conducting line 142 connected to the upper portions of cylinders 117 to apply a pressure in a direction to move the crosshead 109 and bar 128 to their lowermost positions, as shown in Fig. 7. Upon actuation of the valves 139 and 140 by movement of cam follower 137 to the lower level 136a, the valve 139 closes the connection of pipe 142 to the supply line 118, and if desired, may also connect the line 142 to atmosphere. The valve 140 changes the connection of the line 143 from atmosphere to the connection leading to the supply line 118. The admission of the fluid or compressed air to the lower portions of cylinders 117 beneath the pistons 116 produces immediate upward movement of the pistons and cross bar 128 to elevate each crosshead 109. As the crosshead 109 of Fig. 7 moves upwardly, it first engages the buttons 114 and 115 to operate the suction-controlling rods 112 and 113. Since the suction head 105 is in a position lower than 104, it will be seen the button 115 is first engaged to open the suction valve to atmosphere, breaking the vacuum within the suction head, thus depositing the plate 102 on the conveyor 106.

Subsequent movement of crosshead 109 operates the valve rod 112 to apply suction to a separator in the stack pile 103. Continued movement of crosshead 109 lifts the tubular supports 107 and 108 to their uppermost positions safely above the top of the magazines or supply hoppers formed by the angular members 100 and 101. Adequate time is given for completion of the upward movement of the suction heads, after which the outwardly extending or radially increasing surface 129a of cam 120 and the surface 120b of decreasing radius are effective to rotate the rocker arms 121 and 122 in a clockwise direction about their pivotal supports 125 and 126 to transport the suction head 105 to a registered position about the stack pile 102 and to transport the suction head 104 to a registered position above the conveyor 106. The duration of the transporting movement has been shown by the brackets applied to the cam 136 of Fig. 8–A.

Immediately following the arrival of the suction heads 104 and 105 in their new positions, the cam follower 137 is returned to the position shown in Fig. 8–A for immediate lowering of both suction heads, this being brought about by gravity. The tubular supports 107 and 108 are freely slidable through the crosshead 109. The suction head 105 is brought to rest against the uppermost plate in hopper 102, while the suction head 104 continues to descend until it is brought to rest by engagement with the negative plate 102 of the separator carried thereby.

Immediately following the descent of the suction heads 104 and 105, the valves 139 and 140 are again operated to elevate the suction heads. As soon as they have reached their uppermost positions, an intermittent drive 145, Figure 8, which may be of the form shown in Fig. 1, is effective through a sprocket chain 146 to drive the sprocket 147 and the associated sprocket chain (not shown) on which is mounted the conveyor belt 106 to advance the conveyor a distance of one station.

In accordance with the modifications of Figs. 7–8, it will be seen that but half the number of element assembly stations are required. For example, in the partial side elevation of the appaartus, as shown in Fig. 8, the three pairs of suction heads 150, 151 and 152, each operating in the same manner as the heads 104 and 105 of Fig. 7, will each be effective to deposit on the conveyor 106 a battery plate and a battery separator, after which the convevor is moved forward a distance equal to that between adjacent assembly stations. Thus, a partially assembled element 153 may comprise nine plates and nine separators; a partially assembled element 154, ten plates and ten separators; while a completed element 155 will comprise eleven plates and ten separators.

Fig. 8 has been referred to as a partial side elevation by reason of the fact that it illustrates the apparatus of Fig. 7 as viewed from the lefthand side thereof with the rocker arms 121 omitted. The stacks on the lefthand side of the apparatus have also been omitted, and the frame F has been shown in section in Fig. 8 in order to clarify the construction. It is to be observed that the rocker arms 122 at the respective ends of the machine appear in Fig. 8, the rocker arms being pivoted at 130 to cross links 127 to which are bolted the cylinders 117, these cylinders being provided with bosses 117a through which the fastening bolts extend. In Fig. 7, there is shown on conveyor 106 but a single plate 102. This would correspond with the first assembly station which does not appear in Fig. 8.

It is customary practice in the assembly of a storage battery element, to start with a negative plate. The manner in which the apparatus of Figs. 7–8 functions to complete the assembly of an element is diagrammatically shown in Figs. 9 and 10. At the first assembly station of Fig. 9 the crosshead 109 and the two vacuum cups or suction heads 104 and 105 occupy the same positions as in Fig. 7. The first negative plate 102 has been deposited on the conveyor 106, and the suction head 104 is in readiness to lift the separator 103 from the stack pile thereof. At the same assembly station of Fig. 10 the parts are shown after elevation of the suction heads, transport thereof to their righthand positions and after lowering of the suction heads. Accordingly, the separator 103 is shown resting on the negative plate 102 on the conveyor 106, the separator having its grooved surface facing upwardly.

After elevation of the suction heads 104 and 105, the head 105 having attached thereto a negative plate 102, the conveyor is advanced the distance separating two assembly stations.

The aforesaid cycle is repeated at the first station, first to deposit a negative plate on the conveyor 106 and then to deposit on the negative plate a separator 103.

After advance of the negative plate 102 and its separator 103 from the first station to the second station, a crosshead 109a, Fig. 10, operating synchronously with the crosshead 109, both being carried by the cross bar 142, lifts, by its suction head 105a, a positive plate 102a, and upon transport of the crosshead 109a to its first position, Fig. 9, deposits the positive plate 102a on the separator 103, while the suction head 104a descends into engagement with the uppermost separator 103a of the second stack pile, each separator thereof having the grooved surface facing downwardly. Thereafter, the suction heads 104a and 105a ascend, leaving the positive plate 102a on the conveyor and lifting a separator 103a ready for deposit on the positive plate 102a. After registration on the positive plate 102a, as shown at the second station of Fig. 10, the heads are elevated and the conveyor again advances by an amount equal to the separation distance between assembly stations.

The foregoing cycles are repeated as each partially assembled element advances from one assembly station to the other, each assembly receiving in turn additional negative plates, separators and positive plates.

For a seventeen-plate storage battery element there will be seventeen crossheads 109 and 109p, instead of the thirty-three required by the modification of Figs. 1–6. At the last station the suction cup 104p may be omitted, as indicated by the broken lines, but the preferable practice will be to omit filling the last hopper with separators. The suction head 105p will deposit the final negative plate 102p, after which the conveyor 106 will transport the completed element to a transfer station where it will be removed for subsequent operations thereon. Thus, it will be seen the conveyor 106 will after each cycle of operations deliver a completely assembled element to the transfer station.

Referring now to Figs. 11 and 12, it will be seen that in accordance with a further modification of the invention the linear length of the conveyor has been further shortened by an arrangement which includes a turntable 160 having disposed thereon a plurality of stack piles concentric with and in circular array around the pivotal axis 161. The turntable 160 is provided with a plurality of rollers 162 bearing upon a circular guide rail 163 supported from the frame F. Extending through the frame is a drive shaft 164 having secured thereto a ratchet wheel 165 arranged for intermittent operation by means of a pawl 166 supported on an arm 167 pivotally connected at 168 to a slidable link 169 pivotally connected at 170 to a second link 172 driven from a crank 173 secured to the shaft 174. The link 169 is slidably supported by a guide 175 carried by a bearing member 176, the bearing member permitting rotation of the guides 175 about the axis thereof. The remaining parts correspond with those of Figs. 1–6, and like reference characters have been applied thereto. Since their operation in Fig.

12 will be the same as in Figs. 1–6, a further detailed description is unnecessary.

In accordance with the modification of Figs. 11 and 12, the stack piles of plates and separators move relative to the assembly station and the conveyor belts 10. More particularly, the cycle begins with the first stack pile 180 of negative plates opposite the suction head 34 which is operated in registered position above it, lowered, suction applied, and a negative plate transferred to the conveyor belts 10. At that time the crank 173 is effective to operate the pawl 166 against a tooth of the ratchet wheel 165 to advance the stack piles to bring into registration at the assembly station the stack pile of separators 181, having the grooves facing upwardly.

The foregoing cycle of operations is then repeated for the stack pile 182 of positive plates, the stack pile 183 of separators having the grooved surfaces turned downwardly as viewed in Fig. 11. The operation continues, and there are successively deposited the negative plate 184, the separator 185, a positive plate 186, a separator 187, a negative plate 188, a separator 189, and so on until the assembly is completed by the transport of a final negative plate from a stack pile 196 to the conveyor 10.

As shown in Fig. 11, the turntable 160 has been illustrated with seventeen stations for completion of nine-plate storage battery elements comprising four positive plates, five negative plates and eight separators. Upon completion of each element, the conveyor 10 is advanced to move the complete element to a transfer station.

In Fig. 1 the supply magazines 19a are located along one side of the conveyor 10, while in Fig. 12 the supply magazines are in circular array adjacent the assembly station formed by the movable platform of conveyor 10. In Figs. 7–10 the supply magazines are located on opposite sides of the conveyor, and a pair of suction heads cooperates with each opposed pair of magazines. More particularly, Fig. 7, the suction heads 104 and 105 are spaced one from the other by the crosshead 109 a distance such that while one, the suction head 105, is in registration above the conveyor 106, the suction head 104 will be in registration above the supply magazine 100. The pair of suction heads are jointly movable, after elevation, to their uppermost positions to reverse their registered positions so that suction head 105 is moved above and in registration with the supply magazine 101, while the suction head 104 is moved to a position in registration with the conveyor 106. The linkage means utilized in each form of the invention has been found to be a satisfactory and convenient way for translating the suction heads between their respective registered positions. While a second linkage means may be utilized for elevating and lowering the suction heads, the pneumatic arrangement of Figs. 7–10 has been disclosed as illustrative of other ways in which control of the vertical movement may be accomplished.

In each form of the invention the suction head is brought to rest against a component, whether a battery plate or a battery separator, the stack of such components limiting further lowering of the suction head. In each form of the invention the connection between the elevating mechanism for the suction heads is of the lost motion type, that is, after a suction head has been brought to rest the associated linkage means or operating mechanism may continue its movement to complete its stroke, while the suction head is at standstill.

While preferred modifications of the invention have been shown, it is to be understood, of course, that features of one modification may be utilized in conjunction with, or in substitution for, features of other modifications of the invention and that further changes and modifications may be made within the scope of the appended claims.

What is claimed is:

1. In a machine for storage battery element assembly, the combination of a support for a stack pile of assembly items, a second support adjacent thereto for receiving assembly items, a suction head adapted to rest upon the assembly items on said stack pile support and upon the assembled items on the second support, means for imparting to the suction head horizontal travel between the stack pile support and the second support, a vertically movable member, means for imparting vertical motion to said member over a fixed range of travel, and a lost motion connection between said member and the vacuum head whereby the latter is brought to rest at either end of its horizontal travel on the assembly items on said stack pile support and on the assembled items respectively at varying levels.

2. In a machine for storage battery element assembly, the combination of a support for a stack pile of assembly items, a second support adjacent thereto for receiving assembly items, a suction head adapted to rest upon the assembly items on said stack pile support and upon the assembled items on the second support, means for imparting to the suction head horizontal travel between the stack pile support and the second support, a vertically movable member, means for imparting vertical motion to said member over a fixed range of travel, a lost motion connection between said member and the vacuum head whereby the latter is brought to rest at either end of its horizontal travel on the assembly items on said stack pile support and on the assembled items respectively at varying levels, and valve-actuating means for applying suction to said vacuum head while at rest on a stack pile and for releasing said applied suction while said head is at rest on said items assembled on said second support.

3. In a machine for assembling storage battery elements, the combination of a fixed holder for supporting a stack of element components, an intermittently movable conveyor, a pipe flexibly connected to a source of vacuum, means adapted to impart horizontal movement to said pipe with respect to the stack and including a sleeve through which said pipe is freely slidable, a swivel head slidable on said pipe and having a projection provided with an opening therethrough, means for sliding said swivel head on said pipe, a collar on said pipe disposed in the line of travel of said swivel head, a vacuum head, a valve housing joining said vacuum head to the lower end of said pipe and containing a rotary valve body, pawl and ratchet means for rotating the valve body, and a rod passing through the opening in the projection on said swivel head and operatively connected with said pawl and ratchet means, said rod having a head at its upper end, said swivel head being adapted to engage the head on said rod to actuate said pawl and ratchet means and said valve to selectively apply vacuum to said vacuum head or vent said vacuum head to the atmosphere.

4. In a machine for assembling storage battery elements, the combination of a fixed holder for supporting a stack of element components, an intermittently movable conveyor, a tubular member flexibly connected to a source of vacuum, means adapted to impart horizontal movement to said tubular member with respect to the stack and including a sleeve through which said tubular member is freely slidable, a device slidable on said member, means for sliding said device on said member vertically to lift said member, a vacuum head carried by said member at the lower end thereof, a valve between said head and said source, and valve-actuating means operable in timed relation with said horizontal movement of said tubular member selectively to apply vacuum to said vacuum head or vent said vacuum head to the atmosphere.

5. In a machine for assembling storage battery elements, the combination of fixed holding means for supporting stacks of element components, an intermittently movable conveyor on which components may be assembled from said holding means to form elements, a vertical pipe mounted for endwise and translational movement, flexible means connecting the upper end of said pipe to a source of vacuum, a suction cup, a valve housing joining said suction cup to the lower end of said pipe, a rotatable valve body in said valve housing, means for rotating said valve body to selectively apply vacuum to said suction cup or vent said suction cup to the atmosphere, a swivel head slidable on said pipe, a collar on said pipe above and normally spaced from said swivel head, means operatively connecting said swivel head with said valve rotating means, means connected to said swivel head for moving said swivel head relative to said pipe, contact of said swivel head with said collar limiting such relative movement, the relative movement rotating said valve body, upward movement of said swivel head when in contact with said collar moving said pipe endwise, and means for moving said pipe translationally between positions above said holding means and positions above said conveyor.

6. A machine for assembling storage battery elements comprising vertically fixed means adapted to support a plurality of stacks of element components including plates and separators, conveyor means adapted to travel in a horizontal path alongside said fixed means, vacuum means adapted to pick components from the tops of stacks and deposit them on said conveyor means, linkage means for elevating and lowering said vacuum means and translating said vacuum means between positions above said fixed means and positions above said conveyor means and back to positions above said fixed means, engagement of said vacuum means against a component limiting lowering of said vacuum means, the connection between said linkage means and said vacuum means being of the lost motion type, whereby operation of the linkage means is independent of the height of stacks on said fixed means or the height of partially assembled elements on said conveyor means, and means for synchronizing operation of said vacuum means, operation of said linkage means and travel of said conveyor means.

7. A machine for assembling storage battery elements comprising supply magazines adapted to support a plurality of stacks of element components including plates and separators, conveyor means adapted to travel in a horizontal path alongside said magazines, vacuum means adapted to pick components from the tops of stacks and deposit them on said conveyor means, linkage means for elevating and lowering said vacuum means and translating said vacuum means between positions above said fixed means and positions above said conveyor means and back to positions above said fixed means, engagement of said vacuum means against a component limiting lowering of said vacuum means, the connection between said linkage means and said vacuum means being of the lost motion type, whereby operation of the linkage means is independent of the height of stacks on said fixed means or the height of partially assembled elements on said conveyor means, and means synchronizing operation of said vacuum means, operation of said linkage means and travel of said conveyor means for continuous operation of said linkage means and said vacuum means through predetermined cycles between successive horizontal movements of said conveyor means.

8. In a machine for assembling storage battery elements comprising a traveling conveyor and in parallel relation therewith a series of supports for stack piles of plates and separators and a parallel disposed cam shaft and means for driving in synchronism the conveyor and the cam shaft, the combination at each stack pile location of a rocker arm and a guide bar both pivotally supported in upright position for parallel operation, a horizontally disposed member pivotally supported for horizontal travel on the upper ends of the rocker arm and guide bar, a vertical sleeve carried by the said member, a pipe slidably supported in the sleeve, said pipe provided at its lower end with a vacuum lifting head and at its upper end with flexible tube connection to a source of vacuum, a horizontally disposed lever arm pivotally mounted for vertical angular travel on the said horizontally disposed member, lost motion connection between the lever arm and the pipe, means actuated by the cam shaft for imparting intermittent rocking motion to the rocker arm whereby the pipe and vacuum head are alternately transferred from a position over the stack pile to a position over the conveyor and back with periods of rest between, and means actuated by the cam shaft for intermittently imparting to said lever arm during each of said periods of rest of the rocker arm, up and down alternating angular motion whereby said tube and vacuum head are lowered and raised alternately over said stack pile and said conveyor.

9. In a machine for assembling storage battery elements comprising a traveling conveyor and in parallel relation therewith a series of supports for stack piles of plates and separators and a parallel disposed cam shaft and means for driving in synchronism the conveyor and the cam shaft, the combination at each stack pile location of a rocker arm and a guide bar both pivotally supported in upright position for parallel operation, a horizontally disposed member pivotally supported for horizontal travel on the upper ends of the rocker arm and guide bar, a vertical sleeve carried by the said member, a pipe slidably supported in the sleeve, said pipe provided at its lower end with a vacuum lifting head and at its upper end with flexible tube connection to a source of vacuum, a horizontally disposed lever arm pivotally mounted for vertical angular travel on the said horizontally disposed member, lost-motion connection between the lever arm and the pipe, means actuated by the cam shaft for imparting the intermittent rocking motion to the rocker arm whereby the pipe and vacuum head are alternately transferred from a position over the stack pile to a position over the conveyor and back with periods of rest between, means actuated by the cam shaft for intermittently imparting to said lever arm during each of said periods of rest of the rocker arm, up and down alternating angular motion whereby said pipe and vacuum head are lowered and raised alternately over said stack pile and said conveyor, and means actuated by the lever arm for maintaining a vacuum in the head during the transfer from the stack pile to the conveyor and for relieving the vacuum at the completion of said transfer.

10. A machine for assembling storage battery elements comprising a conveyor means, supply magazines disposed on opposite sides of said conveyor means and adapted to support a plurality of stacks of element components including plates and separators, a pair of vertically movable suction heads spaced one from the other for simultaneous registration of one head with a stack of said components on one side of said conveyor means while the other head is in registration with said conveyor means, linkage means for translating said suction heads between positions above a stack of elements on one side of said conveyor means and then above the stack of elements on the other side of said conveyor means, a second linkage means for elevating and lowering said suction heads when in each of said registered positions for picking components from the tops of said stacks and successively depositing them on said conveyor means, engagement of each of said suction heads against a component limiting further lowering of said suction head, the connection between said second linkage means and said suction heads being of the lost motion type, whereby operation of said second linkage means is independent of the height of stacks on said supply magazines or the height of partially assembled elements on said conveyor means, and means for synchronized operation of said suction heads, operation of said linkage means, and travel of said conveyor means for continuous operation of said linkage means and said vacuum means through predetermined cycles between successive horizontal movements of said conveyor means.

11. A machine for assembling storage battery elements comprising conveyor means adapted to travel in a horizontal path, supply magazines on opposite sides of said conveyor means adapted to support a plurality of stacks of element components including plates and separators, a crosshead, vacuum means including suction heads adapted to pick components from the tops of stacks and deposit them on said conveyor means, means connected to said crosshead for elevating and lowering said vacuum means, linkage means for translating said vacuum means between positions where one of said suction heads is registered above a supply magazine while the other suction head is in registered position above said conveyor means and back to positions where a suction head is in registered position above a supply magazine on an opposite side of said conveyor, engagement of said suction heads against a component limiting further lowering thereof and of said vacuum means, the connection between said means and said vacuum means being of the lost motion type, whereby operation of said crosshead is independent of the height of stacks on said supply magazines or the height of partially assembled elements on said conveyor means, and means for synchronizing operation of said vacuum means, operation of said linkage means and travel of said conveyor means.

12. A machine for assembling storage battery elements comprising conveyor means adapted to travel in a horizontal path, a plurality of magazines disposed in opposed pairs on opposite sides of said conveyor means and adapted to support a plurality of stacks of element components including plates and separators, a pair of suction heads opposite each pair of magazines adapted to pick components from the top of stacks therein and to deposit them on said conveyor means, the spacing between the center of said suction heads being substantially the same as the spacing of the center of each magazine from the center of said conveyor means for registration of one of said suction heads with said conveyor means when the other suction head is in registration with one or the other of said opposed pair of magazines, structure for elevating and lowering said suction heads, linkage means for translating said suction heads between said positions of registry first above said conveyor means and one of said pair of magazines and then in registry with said conveyor means and the other of said pair of magazines, engagement of one of said suction heads against a component limiting lowering of said suction head, the driving connection between each suction head and said structure being of the lost motion type whereby operation of said structure is independent of the height of stacks in said magazines or the height of a partially assembled element on said conveyor means, and means for synchronizing operation of said suction heads, operation of said structure, and operation of said linkage means for deposit on said conveyor of a component from each opposed pair of magazines followed by travel of said conveyor means a distance equal to the spacing between said pairs of magazines along the length of said conveyor means.

References Cited in the file of this patent

UNITED STATES PATENTS

| Number | Name | Date |
|---|---|---|
| 583,376 | Hoppe | May 25, 1897 |
| 1,029,206 | McCall | June 11, 1912 |
| 1,089,274 | Von Sagenhofen | Mar. 3, 1914 |
| 1,578,822 | Glover | Mar. 30, 1926 |
| 1,715,358 | Harrold | June 4, 1929 |
| 1,749,620 | Winslow | Mar. 4, 1930 |
| 1,941,106 | Park, Jr. | Dec. 26, 1933 |
| 2,225,006 | Gudger et al. | Dec. 17, 1940 |
| 2,260,540 | Schramm | Oct. 28, 1941 |
| 2,320,094 | Nash | May 25, 1943 |
| 2,324,523 | Lund | July 20, 1943 |
| 2,523,910 | Lund | Sept. 26, 1950 |